(12) United States Patent
Song et al.

(10) Patent No.: US 12,062,077 B2
(45) Date of Patent: Aug. 13, 2024

(54) METHOD AND SYSTEM FOR PROVIDING SEARCH RESULTS FOR SIMILAR PRODUCTS BASED ON DEEP-LEARNING

(71) Applicant: NHN CORPORATION, Seongnam-si (KR)

(72) Inventors: Chiyoung Song, Gyeonggi-do (KR); Gunhan Park, Gyeonggi-do (KR)

(73) Assignee: NHN CORPORATION, Gyeonggi-Do (KR)

( * ) Notice: Subject to any disclaimer, the term of this patent is extended or adjusted under 35 U.S.C. 154(b) by 369 days.

(21) Appl. No.: 17/446,113

(22) Filed: Aug. 26, 2021

(65) Prior Publication Data
US 2022/0067812 A1    Mar. 3, 2022

(30) Foreign Application Priority Data

Aug. 26, 2020    (KR) .................. 10-2020-0107951

(51) Int. Cl.
*G06Q 30/0601* (2023.01)
*G06F 18/22* (2023.01)
*G06N 3/045* (2023.01)

(52) U.S. Cl.
CPC ......... *G06Q 30/0627* (2013.01); *G06F 18/22* (2023.01); *G06N 3/045* (2023.01); *G06Q 30/0629* (2013.01); *G06Q 30/0643* (2013.01)

(58) Field of Classification Search
CPC .......... G06Q 30/0601; G06Q 30/0627; G06Q 30/0629; G06Q 30/0643; G06Q 30/0623;
(Continued)

(56) References Cited

U.S. PATENT DOCUMENTS 11,107,143 B2 *   8/2021   Guo .................. G06N 3/08
11,200,445 B2 *  12/2021   Afshar .............. G06N 3/08
(Continued)

FOREIGN PATENT DOCUMENTS

KR    10-2004-0034337    4/2004
KR      10-1768521       8/2017
(Continued)

OTHER PUBLICATIONS

Office Action dated Nov. 3, 2021 for Korean Patent Application No. 10-2020-0107951 and its English Translation from Global Dossier.
(Continued)

*Primary Examiner* — Edward F Urban
*Assistant Examiner* — Benedict E Lee
(74) *Attorney, Agent, or Firm* — Womble Bond Dickinson (US) LLP

(57) ABSTRACT

A method and a system for providing a search result for similar products based on deep learning receive a search image including a product to be searched; search similar product images by performing deep learning based on the search image; when a plurality of the similar product images are searched, performing a first arrangement based on a target similarity for each of the plurality of similar product images; performing deep learning on the plurality of the similar product images, arranged based on the target similarity, based on one or more predetermined parameters; obtaining a mutual similarity representing a similarity between at least two of the plurality of similar product images by performing the deep learning based on the predetermined parameter; obtaining an integrated similarity for each of the plurality of similar product images based on the mutual similarity and the target similarity; performing a second arrangement by arranging the plurality of similar product images based on the integrated similarity; and
(Continued)

providing the plurality of the similar product images arranged by the second arrangement.

16 Claims, 13 Drawing Sheets

(58) Field of Classification Search
CPC .... G06Q 30/0641; G06F 18/22; G06N 3/045; G06N 3/08; G06V 10/82; G06V 10/46; G06V 10/469
See application file for complete search history.

(56) References Cited

U.S. PATENT DOCUMENTS

| | | | |
|---|---|---|---|
| 11,348,230 B2 * | 5/2022 | Sun | G06T 7/11 |
| 11,417,082 B2 * | 8/2022 | Zheng | G06Q 30/0643 |
| 11,615,135 B2 * | 3/2023 | Inoue | G06Q 30/0601 |
| | | | 705/27.2 |

FOREIGN PATENT DOCUMENTS

| | | |
|---|---|---|
| KR | 10-2020-0010672 | 1/2020 |
| KR | 10-2020-0023091 | 3/2020 |

OTHER PUBLICATIONS

Notice of Allowance dated May 10, 2022 for Korean Patent Application No. 10-2020-0107951 and its English Translation from Global Dossier.

* cited by examiner

[FIG. 1]
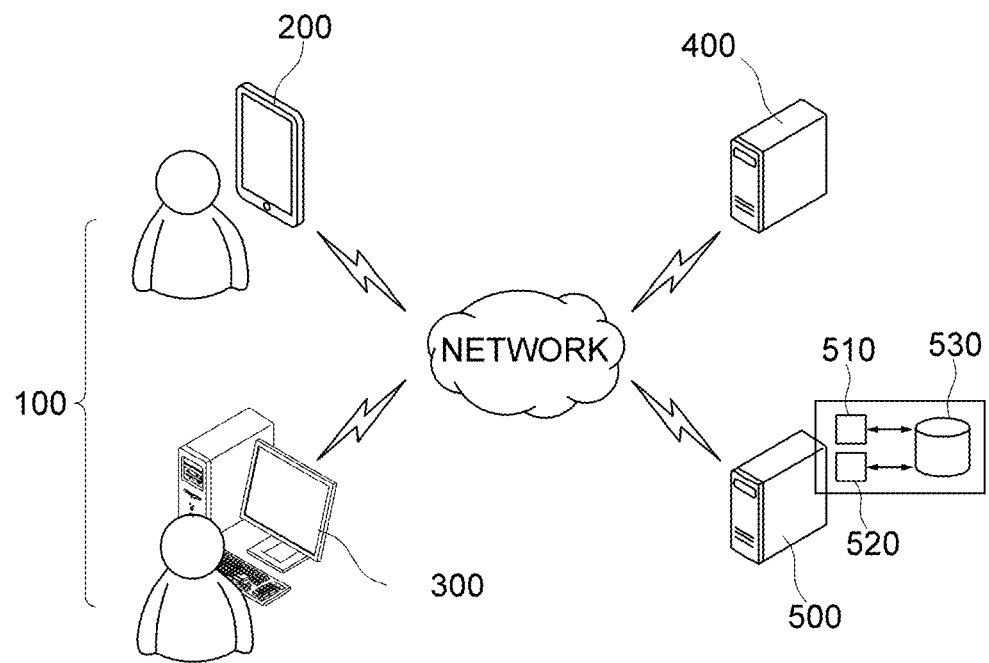

[FIG. 2]
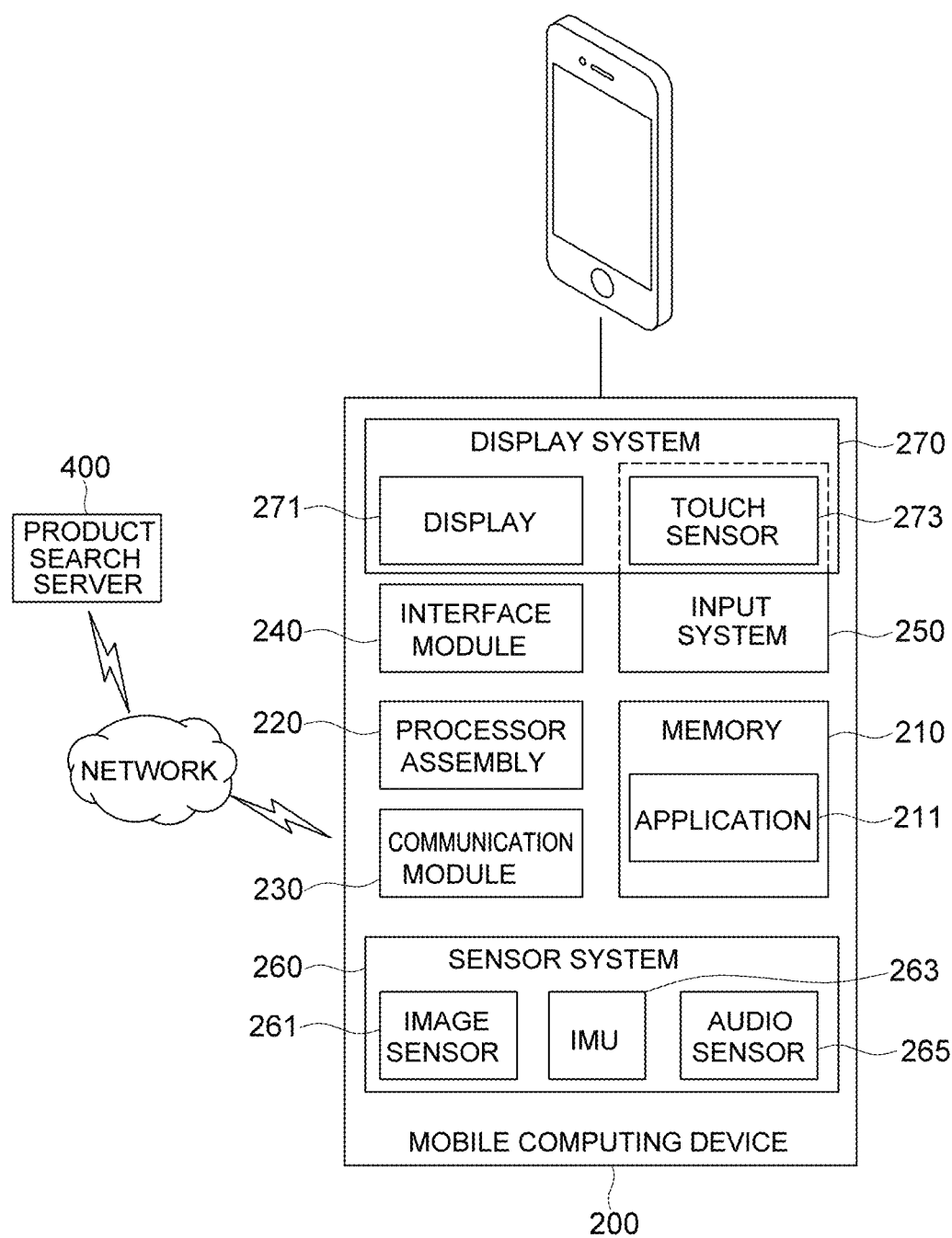

[FIG. 3]
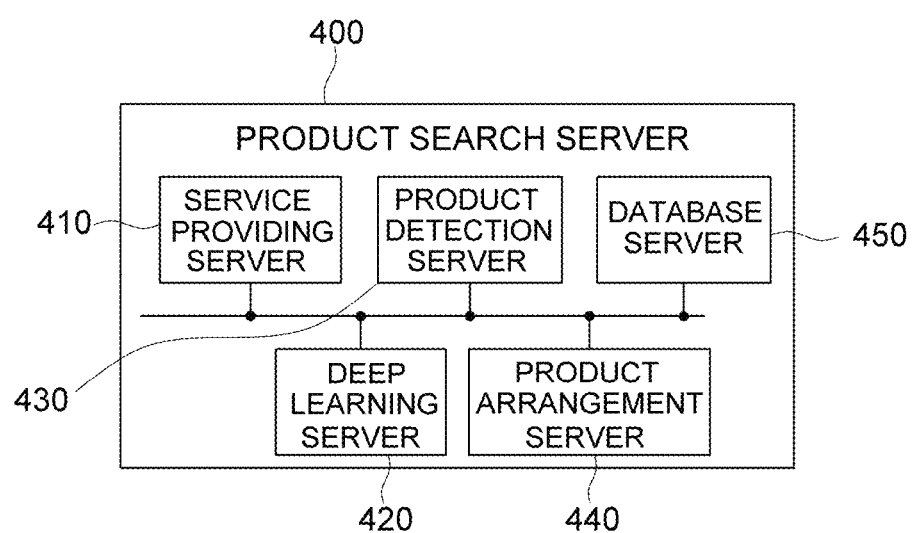

[FIG. 4]
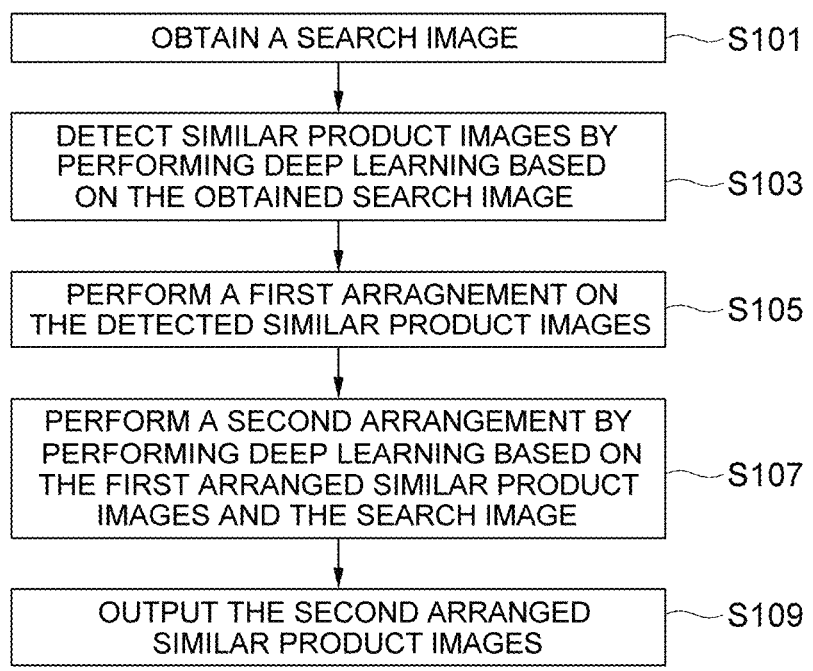

[FIG. 5]
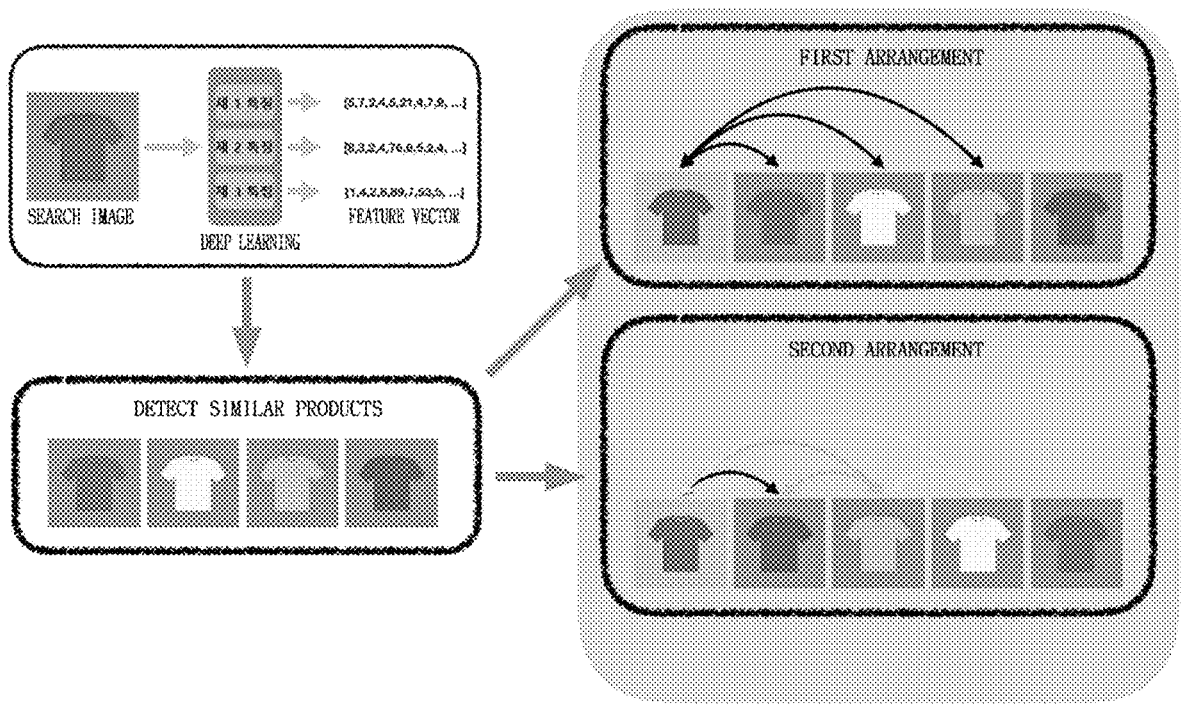

[FIG. 6A]

[FIG. 6B]

[FIG. 7]
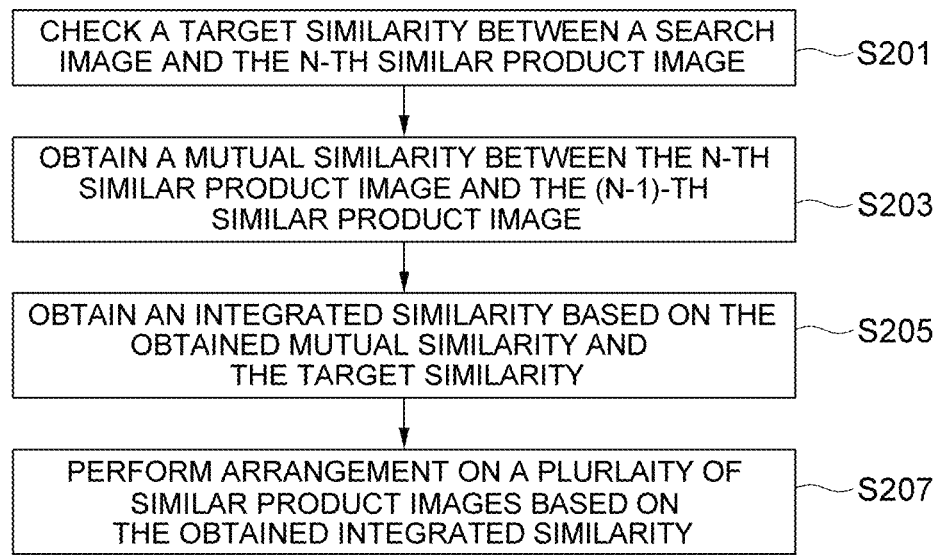

[FIG. 8]
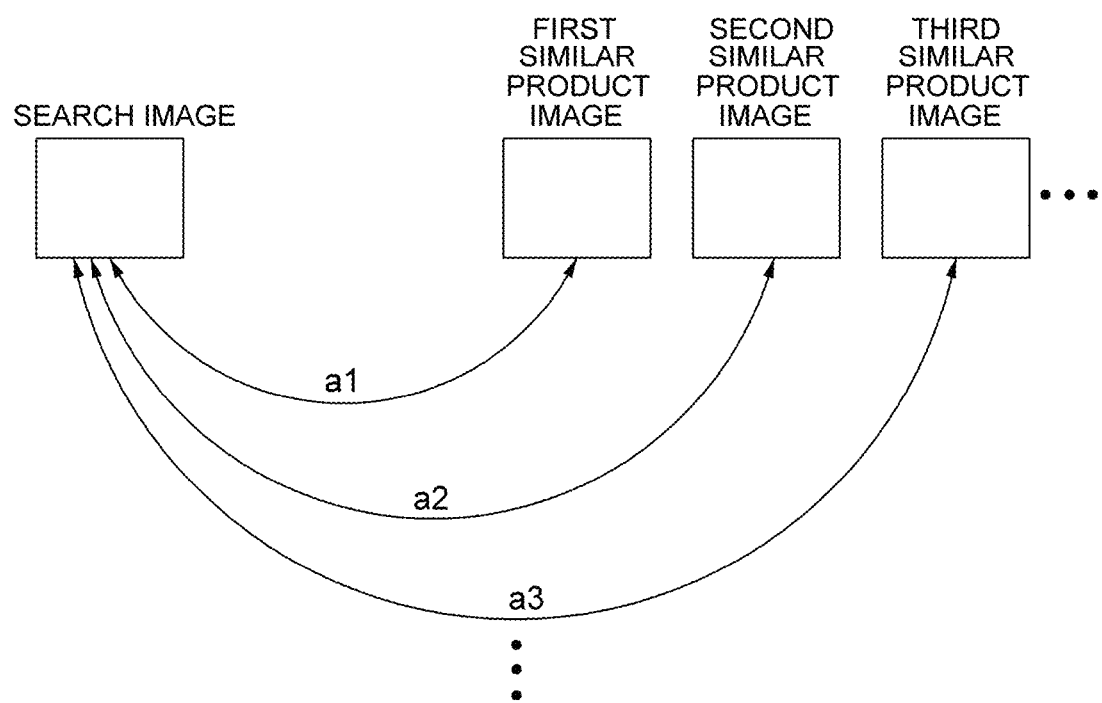

[FIG. 9]
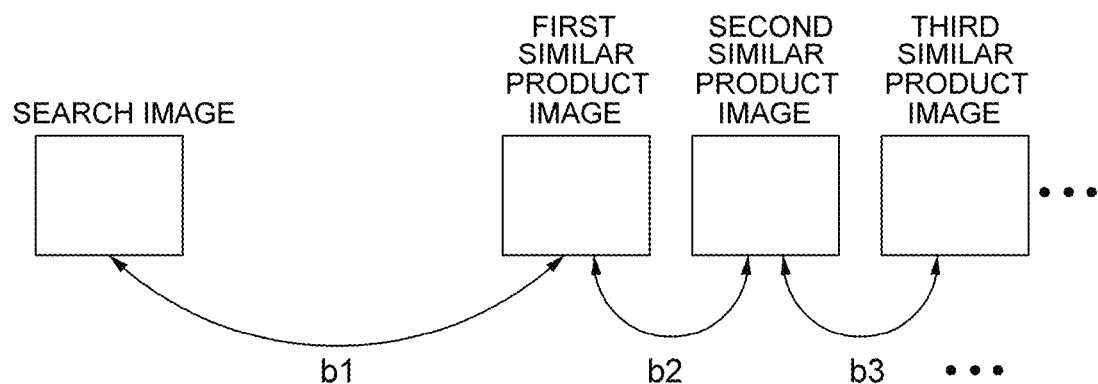

[FIG. 10]
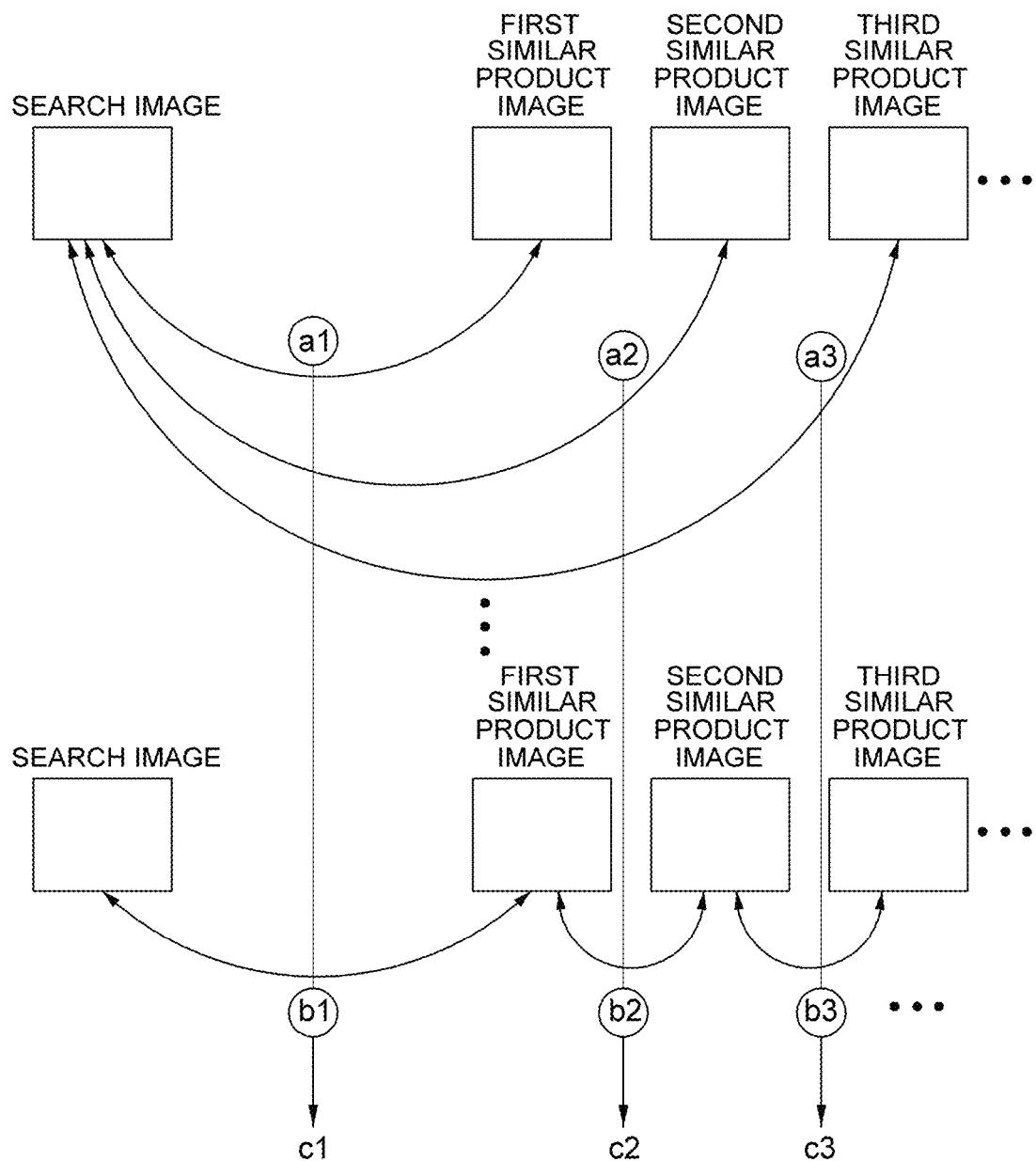

[FIG. 11A]

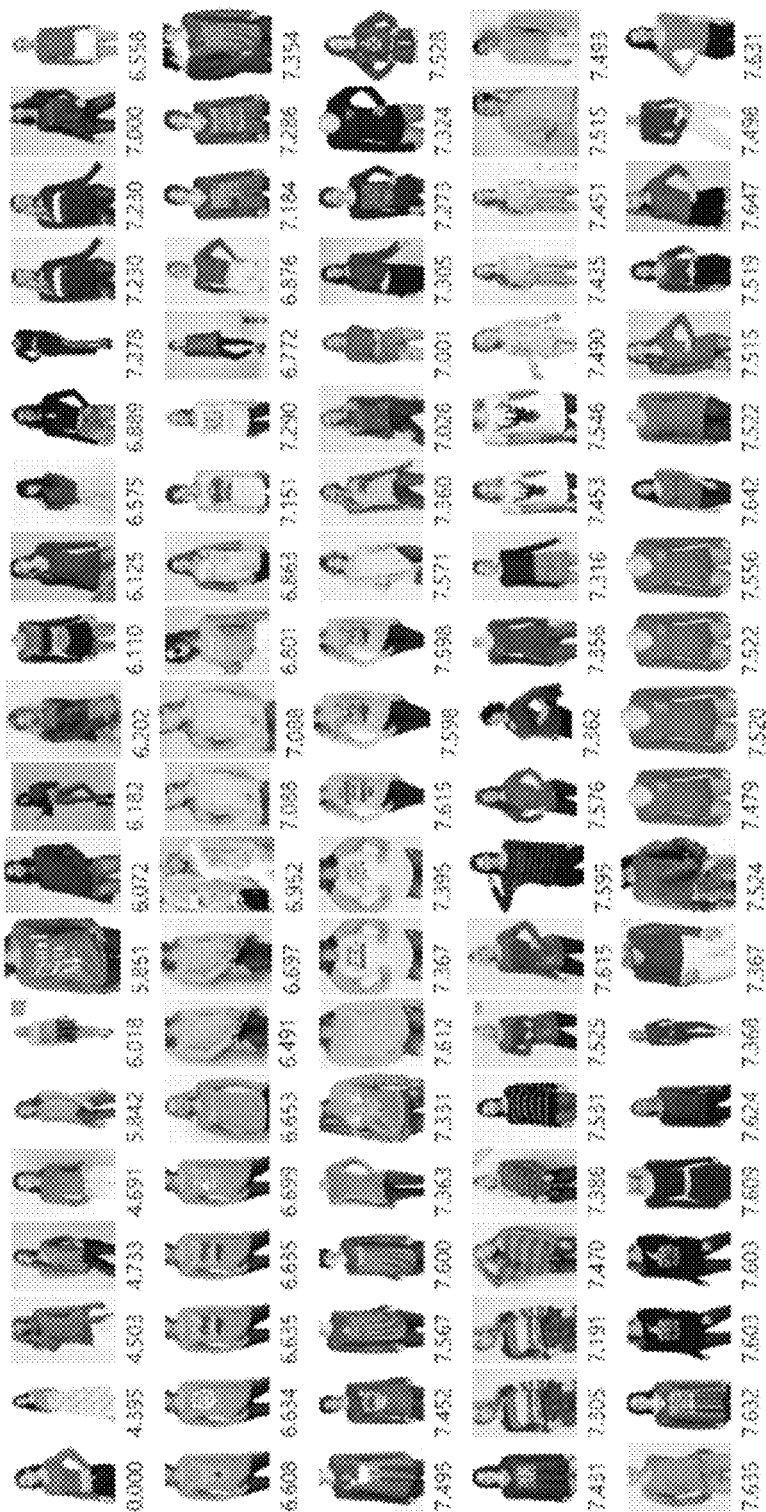
[FIG. 11B]

METHOD AND SYSTEM FOR PROVIDING SEARCH RESULTS FOR SIMILAR PRODUCTS BASED ON DEEP-LEARNING

CROSS REFERENCE TO RELATED APPLICATION

This application claims priority from and benefits of Korean Patent Application No. 10-2020-0107951, filed on Aug. 26, 2020, which are hereby incorporated by reference for all purposes as if fully set forth herein.

BACKGROUND

Technical Field

The present disclosure generally relates to a method and a system for providing a search result for similar products based on deep learning. More particularly, some embodiments of the present disclosure relate to a method and a system for arranging and providing a search result for similar products based on deep learning.

Related Art

Recently, with the advances of various Information and Communications Technologies (ICT), online shopping activities are significantly increasing, where consumers check and purchase products provided by an online shopping mall server through a terminal such as a Personal Digital Assistant (PDA), a smartphone, and/or a desktop computer.

Here, the online shopping mall refers to a device or place where products may be purchased and sold online through a network such as the Internet.

These online shopping malls require differentiated services that may increase their competitiveness as the number of individual online shopping malls increases rapidly in recent years, and various solutions are now being developed to provide differentiated services.

For example, when a user searches an online shopping mall for a specific product, the user may search for similar products related to the desired product among a vast amount of products existing in the online shopping mall to satisfy the needs of the user who may wish to check whether the corresponding shopping mall has products similar to the specific product that the user wants to find.

In addition, to provide an effective search technique for a vast amount of products online, a user searches for similar products based on an image of a specific product that the user wants to find, and the technique aims to satisfy the user's needs when the user does not know the name of the product, when it is not easy for the user to find the desired product by using existing search methods (for example, a category search or a keyword search), or when the user wants to check products similar to the desired product conveniently.

However, the image-based similar product search technique analyzes the similarity between an image of a specific product that a user wants to find and a plurality of product images provided by a shopping mall server. Based on the analyzed similarity, the image-based similar product search technique may just collectively display at least part of the product images determined to be similar to the image of the specific product to find.

In other words, the image-based similar product search technique may provide a similar product search result by considering only the one-to-one similarity between the image of a specific product to be searched and the product image provided by the shopping mall server. Thus, when a plurality of similar products are detected, it becomes difficult to arrange and provide a plurality of similar products consistently.

For example, ordinary users may be susceptible to the color factor in determining similarity between images.

However, when an image-based search is performed to find a similar product, the corresponding similar products are detected based on the color in the image of a specific product to find as well as on various feature vector parameters. And, images of the plurality of similar products are provided by being arranged according to the similarity measure based on the various feature vector parameters. Therefore, the image-based search may exhibit a limit that images of a plurality of similar products may not be arranged and provided after a decent visualization according to the factor (here, color) to which the user reacts sensitively.

Therefore, it is necessary to introduce a technique to increase user satisfaction by solving the problem above and, at the same time, improving the quality of an image-based similar product search service in the online shopping mall.

PRIOR ART REFERENCES

Patents (Patent 1) Korean Patent Application Publication No. 10-2020-0010672 A

SUMMARY

The present disclosure has been made in an effort to implement a method and a system for providing a search result for similar products based on deep learning. The method and the system may provide a search result based on the deep learning of images, including an image of a product to be searched, by arranging the corresponding search result according to a specific parameter.

Specifically, the method and the system provide a search result by arranging a plurality of similar product images obtained from the search result for similar products consistently by measuring not only the similarity between an image (e.g. a target object) including a product to be searched and images (e.g. a search result) including similar products but also the similarity between similar product images derived from the search result.

Technical objects to be achieved by the present disclosure and embodiments according to the present disclosure are not limited to the technical objects described above, and other technical objects may also be addressed.

A method and a system for providing a search result for similar products based on deep learning according to an embodiment of the present disclosure provide a search result for similar products based on deep learning of images by a product search result arrangement application executed by a computing device, the method comprising obtaining a search image including a product to be searched; obtaining similar product images by performing deep learning based on the obtained search image; when there are a plurality of the obtained similar product images, performing a first arrangement based on a target similarity for each of the plurality of similar product images; performing deep learning based on a predetermined parameter on the plurality of the first arranged similar product images; obtaining, based on deep learning according to the predetermined parameter, a mutual similarity representing a similarity based on the predetermined parameter among at least part of the plurality of similar product images; obtaining an integrated similarity for each of the plurality of similar product images based on the obtained mutual similarity and the target similarity; performing a second arrangement on the plurality of similar product images based on the obtained integrated similarity; and providing the plurality of the second arranged similar product images.

At this time, the obtaining similar product images includes obtaining the target similarity representing a similarity between the search image and the similar product image based on feature vectors of the search image and the similar product image.

Also, the obtaining the mutual similarity includes obtaining the mutual similarity of an n-th similar product image by performing deep learning based on the predetermined parameter on the n-th similar product image and the (n−1)-th similar product image, which is a similar product image showing similarity to the search image one-step higher than the n-th similar product image.

Also, the predetermined parameter is at least one of a product color parameter, a product shape parameter, a product texture parameter, or a product model pose parameter.

Also, the obtaining the mutual similarity further includes obtaining the mutual similarity for each of the plurality of similar product images.

Also, the integrated similarity is obtained based on a target similarity value of the n-th similar product image according to a similarity between the search image and the n-th similar product image and a mutual similarity value of the n-th similar product image according to a similarity between the n-th similar product image and the (n−1)-th similar product image.

Also, the obtaining the integrated similarity includes obtaining an integrated similarity value sequentially for each of the plurality of the first arranged similar product images.

Also, the obtaining the integrated similarity further includes obtaining the integrated similarity value of the n-th similar product image and then obtaining the integrated similarity value of the (n+1)-th similar product image, which is a similar product image showing similarity to the search image one-step lower than the n-th similar product image.

Also, the second arranging the plurality of similar product images based on the integrated similarity includes comparing the obtained integrated similarity values with each other each time the integrated similarity values of the n-th similar product image and the (n+1)-th similar product image are obtained sequentially.

Also, the second arranging the plurality of similar product images includes arranging the similar product images in descending order of the integrated similarity by comparing the obtained integrated similarity values with each other.

A method and a system for providing a search result for similar product images based on deep learning according to an embodiment of the present disclosure may provide a similar product search result based on deep learning of an image including a product to be searched by arranging the corresponding search result based on the similarity according to a specific parameter. Therefore, the method and the system may enable a user to more conveniently and intuitively recognize a plurality of similar product images according to a predetermined criterion (for example, color), through which the quality of a similar product search result based on deep learning is improved.

Also, a method and a system for providing a search result for similar product images based on deep learning according to an embodiment of the present disclosure may provide a similar product search result by measuring not only the similarity between an image including a product to be searched (e.g. a target object) and images including similar products (e.g. a search result) but also the similarity based on a specific parameter among similar product images derived from the search result and arranging a plurality of similar product images based on the measured similarities. Therefore, the method and the system may have the technical effect of providing a search result by detecting similar product images for a search image based on a precise and accurate similarity, further considering the similarity among a plurality of images based on a predetermined criterion (or parameter) in addition to the similarity to the search image based on a feature vector.

Also, a method and a system for providing a search result for similar product images based on deep learning according to an embodiment of the present disclosure may provide a similar product search result based on image deep-learning by arranging the similar product search result based on the similarity according to a predetermined parameter. Therefore, the method and the system may maximize the reflection of the user's needs to check products similar to a search image easily and quickly and increase the competitiveness of an online shopping mall.

The technical effects of the present disclosure are not limited to the technical effects described above, and other technical effects not mentioned herein may be understood clearly from the description below.

BRIEF DESCRIPTION OF THE DRAWINGS

FIG. 1 is a system for providing a similar product search result based on deep learning according to an embodiment of the present disclosure.

FIG. 2 illustrates an internal block diagram of a mobile-type computing device according to an embodiment of the present disclosure.

FIG. 3 illustrates an internal block diagram of a product search server according to an embodiment of the present disclosure.

FIG. 4 is a flow diagram illustrating a method for providing a similar product search result based on deep learning according to an embodiment of the present disclosure.

FIG. 5 illustrates a method for providing a similar product search result based on deep learning according to an embodiment of the present disclosure.

FIGS. 6A and 6B are examples illustrating a plurality of similar product images arranged by first arrangement according to an embodiment of the present disclosure.

FIG. 7 is a flow diagram illustrating a method for performing second arrangement on a plurality of similar product images according to an embodiment of the present disclosure.

FIG. 8 is one example illustrating a target similarity according to an embodiment of the present disclosure.

FIG. 9 is one example illustrating a mutual similarity according to an embodiment of the present disclosure.

FIG. 10 is one example illustrating an integrated similarity according to an embodiment of the present disclosure.

FIGS. 11A and 11B are examples illustrating a plurality of similar product images arranged by second arrangement according to an embodiment of the present disclosure.

DESCRIPTION OF EXEMPLARY EMBODIMENTS

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various forms. In the following embodiments, the terms such as first and second are introduced to distinguish one element from the others, and thus the technical scope of the present disclosure should not be limited by those terms.

FIG. 1 is a system for providing a similar product search result based on deep learning according to an embodiment of the present disclosure.

Referring to FIG. 1, a system for providing a similar product search result based on deep learning according to an embodiment of the present disclosure may include a computing device 100, a product search server 400, and a shopping mall server 500.

In the embodiment, when operating in conjunction with each other through an application for arranging a product search result provided by the product search server 400 (hereinafter a "product arrangement application") and providing a similar product search result based on deep learning of images including a search product (namely, search images), the computing device 100, the product search server 400, and the shopping mall server 500 may provide a service for providing a deep learning-based similar product search result (hereinafter a "similar product arrangement search service") that provides a search result by arranging the corresponding search result according to a specific parameter.

Specifically, in the embodiment, the computing device 100 may install the product arrangement application by downloading the application from the product search server 400 or the application provision server and provide the similar product arrangement search service by operating the product arrangement application.

At this time, according to the embodiment, the product arrangement application may be, for example, but not limited to, an application capable of providing a comprehensive online product search platform including a keyword-based search service, a category-based search service, and/or an image-based search service related to a product search in the online shopping mall.

In the embodiment below, it is assumed that the product arrangement application performs a product search in the online shopping mall based on a search image; however, the present disclosure is not limited to the assumption, and various other embodiments may also be applied.

Specifically, the product arrangement application according to the embodiment may acquire a search image which is an image capturing a search product.

Also, the product arrangement application may detect a similar product image by performing deep learning based on the obtained search image.

Also, the product arrangement application may perform first arrangement on a plurality of similar product images when the number of detected similar product images is more than one.

At this time, the product arrangement application may perform the first arrangement on the plurality of similar product images based on the similarity obtained based on a feature vector between a search image and a similar product image (hereinafter a "target similarity").

Here, the feature vector according to the embodiment may mean a parameter (variable) specifying a feature of an object within an image.

The feature vector according to the embodiment may include at least one or more of texture, fabric, shape, style, and/or color parameter, where each parameter value may be derived based on a deep learning neural network (for example, a pre-trained deep learning neural network for feature vector extraction).

Also, the product arrangement application according to the embodiment may perform second arrangement on a plurality of the similar product images arranged by the first arrangement.

Specifically, the product arrangement application may perform deep learning of a search image and/or similar product images based on one or more predetermined parameters (for example, a product shape, color, texture, and/or model pose).

And the product arrangement application may acquire a similarity based on the predetermined parameter between at least two of similar product images (in the embodiment, a mutual similarity) by performing the deep learning.

Also, the product arrangement application may perform the second arrangement on a plurality of similar product images based on the similarity obtained according to the predetermined parameter.

Also, the product arrangement application according to the embodiment may output and provide the similar product images arranged by the second arrangement.

Meanwhile, the computing device 100, the product search server 400, and the shopping mall server 500 of FIG. 1 may be connected through a network.

Here, the network may refer to a connection structure enabling exchange of information between individual nodes, such as the computing devices 100, the product search server 400, and the shopping mall server 500, where examples of the network include a 3rd Generation Partnership Project (3GPP) network, a Long Term Evolution (LTE) network, a World Interoperability for Microwave Access (WiMAX) network, Internet, a Local Area Network (LAN), a Wireless Local Area Network (WLAN), a Wide Area Network (WAN), a Personal Area Network (PAN), a Bluetooth network, a satellite broadcasting network, an analog broadcasting network, and a Digital Multimedia Broadcasting (DMB) network, but are not limited thereto.

Computing Device 100

The computing device 100 according to the embodiment of the present disclosure provides an environment for using a similar product arrangement search service. When providing a similar product search result based on the deep learning of a search image within the environment for the similar product arrangement search service, the computing device 100 may execute a product arrangement application capable of providing a search result by arranging a search result according to a specific parameter.

According to the embodiment, the computing device 100 may include various types of computing devices 100 (for example, a mobile type or desktop type computing device) in which the product arrangement application is installed.

1. Mobile Type Computing Device 200

A mobile type computing device 200 according to the embodiment of the present disclosure may be a mobile device such as a smartphone or a tablet PC in which the product arrangement application is installed.

Examples of the mobile type computing device 200 may include a smartphone, a mobile phone, a digital broadcasting terminal, a Personal Digital Assistant (PDA), a Portable Multimedia Player (PMP), and a tablet PC.

FIG. 2 illustrates an internal block diagram of a mobile-type computing device according to an embodiment of the present disclosure.

Referring to FIG. 2, the mobile type computing device 200 according to an exemplary implementation may include a memory 210, a processor assembly 220, a communication module 230, an interface module 240, an input system 250, a sensor system 260, and a display system 270. These constituting elements may be arranged to be included within a case or housing of the mobile type computing device 200.

Specifically, the memory 210 may be configured to store the product arrangement application 211. The product arrangement application 211 may be configured to store at least one or more of various application programs, data, and commands for providing an environment for implementing a similar product arrangement search service.

For example, the memory 210 may include a search image, similar product images, a feature vector, a parameter, a target similarity, a mutual similarity, and/or integrated similarity information.

In other words, the memory 210 may store commands and data for generating an environment for the similar product arrangement search service.

Also, the memory 210 may include at least one or more non-volatile computer-readable storage media and volatile computer-readable storage media. For example, the memory 210 may include various storage devices such as a ROM, an EPROM, a flash drive, a hard drive, and web storage that performs a storage function of the memory 210 on the Internet.

The processor assembly 220 may include at least one or more processors capable of executing commands of the product arrangement application 211 stored in the memory 210 to perform various tasks for implementing an environment for the similar product arrangement search service.

The processor assembly 220 according to the embodiment may be configured to control the overall operation of constituting elements through the product arrangement application 211 stored in the memory 210 to provide the similar product arrangement search service.

The processor assembly 220 may include a Central Processing Unit (CPU) and/or a Graphics Processing Unit (GPU). Also, the processor assembly 220 may be implemented as at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, and electric units for performing various functions.

The communication module 230 may include one or more devices for communicating with other computing devices (for example, the product search server 400). The communication module 230 may perform communication through a wireless or wired network.

Specifically, the communication module 230 may be configured to communicate with a computing device storing content sources for implementing an environment for the similar product arrangement search service and may communicate various user input components such as a controller that receives user inputs.

The communication module 230 according to the embodiment may transmit and receive various types of data related to the similar product arrangement search service to and from the product search server 400 and/or other computing devices 100.

The communication module 230 may transmit and receive data wirelessly to and from at least one of a base station, an external terminal, and a particular server on a mobile communication network constructed through a communication apparatus compliant with technology standards or communication methods for mobile communication (for example, Long Term Evolution (LTE), Long Term Evolution-Advanced (LTE-A), 5G New Radio (NR), or WiFi) or a short distance communication method.

The sensor system 260 may include various sensors such as an image sensor 261, a position sensor (IMU, 263), an audio sensor 265, a distance sensor, a proximity sensor, and a touch sensor.

The image sensor 261 may capture an image of a physical space in the surroundings of the mobile type computing device 200.

The image sensor 261 according to the embodiment may capture an image (for example, a search image) related to the similar product arrangement search service.

Also, the image sensor 261 may be disposed on the front and/or rear surface of the mobile type computing device 200 to obtain an image of the surroundings along the disposed direction and capture a physical space through a camera disposed toward the outside of the mobile type computing device 200.

The image sensor 261 may include an image sensor device and an image processing module. Specifically, the image sensor 261 may process a still image or a video obtained by the image sensor device (for example, a CMOS or CCD sensor).

Also, the image sensor 261 may extract required information by processing the still image or the video obtained through the image sensor device using the image processing module and forward the extracted information to the processor.

For example, the image sensor 261 may be a camera assembly including at least one or more cameras. The camera assembly may include a regular camera taking a photograph in the visible light band and/or a special camera such as an infrared camera or a stereo camera.

IMU 263 may detect at least one or more of a motion and an acceleration of the mobile type computing device 200. For example, the IMU 263 may consist of a combination of various positioning sensors such as accelerometers, gyroscopes, and magnetometers. Also, in conjunction with a position module such as GPS of the communication module 230, the IMU 263 may recognize spatial information of the physical space in the surroundings of the mobile type computing device 200.

Also, the IMU 263 may extract information related to the detection and tracking of an eye gaze direction and a user's head motion based on the detected position and orientation.

Also, in some implementation, the product arrangement application 211 may determine the user's position and orientation within a physical space or recognize features or objects within the physical space by using the IMU 263 and the image sensor 261.

The audio sensor 265 may be configured to recognize a sound in the surroundings of the mobile type computing device 200.

Specifically, the audio sensor 265 may include a microphone capable of sensing a voice input of a user of the mobile type computing device 200.

The audio sensor 265 according to the embodiment may receive, from the user, voice data required for a similar product arrangement search service.

The interface module 240 may connect the mobile type computing device 20 to one or more different devices for communication. Specifically, the interface module 240 may include a wired and/or wireless communication device compatible with one or more different communication protocols.

The mobile type computing device 200 may be connected to various input-output devices through the interface module 240.

For example, the interface module 240, connected to an audio output device such as a headset port or a speaker, may output an audio signal.

The present embodiment assumes that the audio output device is connected through the interface module 240, but an alternative embodiment in which the audio output device is installed inside the mobile type computing device 200 may also be implemented.

The interface module 240 may comprise at least one of a wired/wireless headset port, an external charging port, a wired/wireless data port, a memory card port, a port connecting to a device equipped with an identification module, an audio Input/Output (I/O) port, a video I/O port, an earphone port, a power amplifier, an RF circuit, a transceiver, and other communication circuits.

The input system 250 may be configured to receive or detect a user input (for example, a gesture, a voice command, a button operation, or other type of input) related to a similar product arrangement search service.

Specifically, the input system 250 may include, for example, but not limited to, a button, a touch sensor, and an image sensor 261 that receives a user's motion input.

Also, the input system 250, connected to an external controller through the interface module 240, may receive a user's input.

The display system 270 may be configured to display or output various information related to a similar product arrangement search service as a graphic image.

The display system 270 may include, for instance, but not limited to, at least one of a Liquid Crystal Display (LCD), a Thin Film Transistor-Liquid Crystal Display (TFT-LCD), an Organic Light-Emitting Diode (OLED), a flexible display, a three-dimensional (3D) display, and an electronic ink (e-ink) display.

The constituting elements may be disposed within a case or housing of the mobile type computing device 200, and a user interface may include a touch sensor 273 on a display 271 configured to receive a user's touch input.

Specifically, the display system 270 may include the display 271 outputting an image and a touch sensor 273 detecting a user's touch input.

The present embodiment assumes that the display 271 may be implemented as a touch screen by forming a layered structure or being integrated with the touch sensor 273. The touch screen may not only function as a user input unit providing an input interface between the mobile type computing device 200 and the user but also provide an output interface between the mobile type computing device 200 and the user.

2. Desktop Type Computing Device 300

In describing the constituting elements of the desktop type computing device 300, repeated descriptions are substituted by the descriptions of the corresponding constituting elements of the mobile type computing device 200; in what follows, descriptions are given mainly to the difference from the mobile type computing device 200.

The desktop type computing device 300 according to another embodiment may further include a device equipped with a program for executing a similar product arrangement search service based on wired/wireless communication, such as a desktop PC, a laptop computer, or a ultrabook in which the product arrangement application 311 is installed.

Also, the desktop type computing device 300 may receive a user input (for example, a touch input, a mouse input, a keyboard input, a gesture input, and a motion input using a guide tool) using a user interface system.

The desktop type computing device 300 according to an embodiment may obtain a user input by connecting the user interface system to at least one device such as a mouse, a keyboard, a gesture input controller, an image sensor (for example, a camera), and an audio sensor via various communication protocols.

Also, the desktop type computing device 300 may be connected to an external output device through the user interface system, for example, a display device or an audio output device.

Also, the desktop type computing device 300 according to the embodiment may include a memory, a processor assembly, a communication module, a user interface system, and an input system. These constituting elements may be included within a housing of the computing device 300.

Descriptions of the constituting elements of the desktop type computing device 300 are substituted by the descriptions given to the constituting elements of the mobile type computing device 200.

Since the constituting elements of FIG. 2 according to the present embodiment are not essential to implement the computing device 100, the computing device 100 according to the present disclosure may have a greater or fewer number of constituting elements than listed above.

Product Search Server 400

A product search server 400 according to an embodiment of the present disclosure may perform a series of processes for providing a similar product arrangement search service.

Specifically, the product search server 400 may provide the similar product arrangement search service by exchanging required data with the computing device 100 to operate the product arrangement application in the computing device 100.

More specifically, the product search server 400 according to the embodiment may provide an environment in which the product arrangement application may operate in the computing device 100.

Also, the product search server 400 may perform image deep-learning required for a similar product arrangement search service.

Also, the product search server 400 according to the embodiment may perform a product search on an online shopping mall based on a predetermined image or parameter.

Also, the product search server 400 according to the embodiment may perform an arrangement of at least one or more similar product images.

At this time, the product search server 400 may perform an arrangement of a plurality of similar product images based on a similarity between a search image and a similar product image and/or a similarity between a plurality of similar product images.

Also, the product search server 400 according to the embodiment may collect and manage various types of data required for a similar product arrangement search service.

FIG. 3 illustrates an internal block diagram of a product search server according to an embodiment of the present disclosure.

More specifically, referring to FIG. 3, the product search server 400 may include a service providing server 410, a deep learning server 420, a product detection server 430, a product arrangement server 440, and a database server 450.

At this time, depending on embodiments, the respective constituting element may be implemented by separate devices different from the product search server 400 or may be implemented inside the product search server 400. In what follows, the present disclosure assumes that each constituting element is included in the product search server 400, but the present disclosure is not limited to the assumption.

Specifically, the service providing server 410 may provide an environment in which a product arrangement application may operate in the computing device 100.

In other words, the service providing server 410 may provide an environment in which a product arrangement application that provides a similar product arrangement search service based on image deep-learning may operate in the computing device 100.

To this end, the service providing server 410 may include an application program, data, and/or commands for implementing a product arrangement application.

Also, the deep learning server 420 may perform image deep-learning required for a similar product arrangement search service in conjunction with an image deep-learning neural network.

Here, the image deep-learning neural network may include at least one of a Convolution Neural Network (CNN), for example, a U-net CNN, and a Mask R-CNN.

According to the embodiment, the deep learning server 420 associated with the image deep-learning neural network may perform, based on the image input to the image deep-learning neural network, a functional operation using image processing techniques, such as object detection, segmentation, feature map extraction, and/or feature vector extraction.

Specifically, the deep learning server 420 according to the embodiment may perform search image-based similar product detection based on the image deep-learning neural network.

In the embodiment, the deep learning server 420 may input a search image to the image deep-learning neural network as input data.

At this time, the deep learning neural network which has received the search image may detect a similar product corresponding to the input search image from a plurality of products of the shopping mall server 500 and provide the detected similar product as output data.

And the deep learning server 420 may obtain an image of the similar product output from the deep learning neural network.

More specifically, the deep learning server 420 may perform image deep-learning using the image deep-learning neural network, which receives a search image and a plurality of product images within the shopping mall server 500 as input data.

Also, the deep-learning server 420 may calculate a similarity between a search image and each product image (namely, the target similarity according to the embodiment) through the deep-learning performed.

At this time, the deep learning server 420 may derive feature vectors for the search image and each of the product images and calculate a distance value between the derive feature vector values.

Also, the deep learning server 420 may calculate and provide the target similarity between the search image and the product image based on the distance value between the calculated feature vectors.

Also, the deep learning server 420 according to the embodiment may determine at least part of a plurality of products within the shopping mall server 500 as a similar product based on the calculated target similarity and obtain the image of the determined similar product.

Moreover, the deep learning server 420 according to the embodiment may perform image deep-learning based on at least part (in the embodiment, the similar product image) of the plurality of product images within the shopping mall server 500 in conjunction with the image deep-learning neural network.

Specifically, the deep learning server 420 may perform deep learning based on a predetermined product image pair (in the embodiment, a first similar product image and a second similar product image detected by the shopping mall server 500) to calculate the similarity between the predetermined product image pair (namely, the mutual similarity according to the embodiment).

More specifically, the deep learning server 420 may derive a feature vector for each product image of a predetermined product image pair obtained as input data.

Also, the deep learning server 420 may calculate a distance value between derived feature vectors and calculate the mutual similarity between the respective product images of the product image pair based on the calculated distance value to provide the calculated mutual similarity as output data.

Meanwhile, the deep learning server 420 according to the embodiment may recognize an object related to fashion and an area occupied by the object and perform fashion detection that extracts a bounding box for each fashion object.

For example, the deep learning server 420 may include a fashion detector, and the fashion detector may include a first convolution neural network (Conv 1) that passes an input item image to a convolution layer at least once and a second convolution neural network (Conv 2) including an RoI pooling layer, a softmax function, and a bounding box regressor.

Specifically, the first convolution neural network (Conv 1) may receive the whole image and the object candidate area simultaneously as inputs.

And the first convolution network processes the whole image at once through a convolution layer and a max-pooling layer and generates a feature map that binds meaningful objects into feature areas.

Next, the second convolution network passes each object candidate area to the RoI pooling layer to extract a fixed-length feature vector from the feature map.

And the second convolution network applies the extracted feature vector to the Fully-Connected Layer (FCL) and then applies the output data of the FCL to the softmax function arranged at the final stage to specify the type of each object.

At this time, the second convolution network may be trained to extract only a fashion-related object from various types of objects.

Also, the second convolution network may extract a bounding box representing an area occupied by a fashion-related object by applying the output data of the fully connected layer to the bounding box regressor.

The fashion detector having the first convolution network and the second convolution network may specify that the object type is a fashion-related item and extract a feature area occupied by the corresponding item as a bounding box.

In other words, the deep learning server 420 may use a neural network employed to provide similar products based on deep learning after training the neural network to be optimized for fashion items. The deep learning server 420 may specify through the trained neural network that the type of object on the search image is a fashion-related product. The deep learning server 420 may extract and use a specific area occupied by the corresponding product as a bounding box.

Also, the product detection server 430 may provide a similar product search service for an online shopping mall performed based on a predetermined image.

In the embodiment, the product detection server 430 may perform a product search based on a search image in conjunction with the deep learning server 420 and/or the shopping mall server 500 and extract and provide at least one or more similar product images corresponding to the search image.

At this time, when a plurality of similar product images are detected or searched, the product detection server 430 may arrange and provide the plurality of similar product images according to the similarity (e.g. the target similarity) between the similar product image and the search image.

In the embodiment, the product detection server 430 may determine that a similarity becomes higher as a calculated similarity value (for example, a distance value between feature vectors of the respective images) becomes lower.

Thus, to preferentially display a similar product image showing a high similarity, the product detection server 430 may arrange a plurality of similar product images so that the similarity values calculated for each of the plurality of similar product images are listed in ascending order.

In the embodiment of the present disclosure, for the convenience of description, it is assumed that the similarity becomes higher as a similarity value becomes lower. However, the assumption above is only an example and is provided for illustration purposes only, and various other embodiments may also be possible.

In addition, in the embodiment, when a plurality of similar product images are detected for a search image, the product arrangement server 440 may perform rearrangement based on a predetermined parameter (for example, a product shape, color, texture, and/or a model pose) on the plurality of similar product images provided by being arranged according to the target similarity between the corresponding search image and each similar product image. A detailed description of the operation above will be given when a method for providing a search result for similar products based on deep learning is described later.

Also, the database server 450 may store and manage various application programs, applications, commands, and/or data for implementing a similar product arrangement search service.

In the embodiment, the database server 450 may store and manage search images, similar product images, feature vectors, parameters, target similarity, mutual similarity, and/or integrated similarity information.

Also, in the embodiment, the database server 450 may include a feature vector database for storing and managing feature vector information for each product of the shopping mall server 500.

Specifically, the database server 450, in conjunction with at least one or more shopping mall servers 500, may construct a feature vector database that stores feature vector information of each of at least one or more products provided by each shopping mall server 500.

At this time, the feature vector information for each of at least one or more products provided by each shopping mall server 500 may be obtained based on deep learning of the image of the corresponding product.

Meanwhile, the product search server 400 may comprise at least one or more service providing servers 410, the deep learning server 420, the product detection server 430, the product arrangement server 440, and/or the database server 450. The product search server 400 may include processors for data processing and memories for storing commands for providing a similar product arrangement search service.

Also, according to the embodiment of the present disclosure, the product search server 400 performs image deep-learning required for a similar product arrangement search service, performs a product search based on a predetermined image, performs arrangement of at least one or more similar product images obtained as a product search result, and collect and manage various data required for the similar product arrangement search service. However, depending on embodiments, different implementation may also be made such that the computing device 100 performs part of the functional operations performed by the product search server 400.

Shopping Mall Server 500

A shopping mall server 500 according to an embodiment of the present disclosure may perform a series of processes for providing an online shopping mall service.

More specifically, the shopping mall server 500 according to the embodiment may provide the computing device 100 with an environment for providing an e-commerce online shopping mall service in which a user may order or sell a product through the network.

Also, the shopping mall server 500 may transmit and receive various types of data required for a similar product arrangement search service to and from the computing device 100 and/or the product search server 400.

The shopping mall server 500 according to the embodiment may transmit information on a plurality of products (for example, a product image and/or product information) on an online shopping mall to the computing device 100 and/or the product search server 400, and receive information related to the needs for a specific product on the online shopping mall (for example, information on the product searched from the corresponding online shopping mall) from the computing device 100 and/or the product search server 400.

Also, the shopping mall server 500 may store at least one or more of application programs, data, and commands required for functional operations related to an online shopping mall service.

According to the embodiment, the shopping mall server 500 may store and manage product images and/or product information of at least one or more products on the online shopping mall.

More specifically, referring to FIG. 1, the shopping mall server 500 may include a shopping mall service providing server 510, a product management server 520, and a data storage server 530.

Here, the shopping mall service providing server 510 may provide an environment that enables an online shopping mall service to operate on a computing device.

In other words, the shopping mall service providing server 510 may provide an environment for implementing an online shopping mall service providing an online shopping mall which is a virtual shop where a product may be bought or sold on the Internet using a computing device 100.

The shopping mall service providing server 510 according to the embodiment may include various application programs, data, and/or commands capable of implementing a service provided in conjunction with an online shopping mall service.

Also, the product management server 520 may be configured to perform a management function for at least one or more products provided based on an online shopping mall service.

The product management server 520 according to the embodiment may manage a product name, a product image, a product price, and/or remaining quantities of the product.

Also, the data storage server 530 may store and manage various application programs, applications, commands, and/or data for implementing an online shopping mall service.

For example, the data storage server 530 may store and manage personal information, shopping information, and/or order information for each user who uses an online shopping mall service by matching the information to the corresponding user account.

The shopping mall server 500 may comprise at least one or more of the shopping mall service providing server 510, the product management server 520, and/or the data storage server 530. The shopping mall server 500 may include processors for data processing and memories for storing commands for providing an online shopping mall service.

Method for Providing a Search Result for Similar Products Based on Deep Learning In what follows, a method for providing a search result for similar products based on image deep-learning by a product arrangement application executed in the computing device 100 will be described in detail with reference to FIGS. 4 to 11.

Here, the product arrangement application may refer to the product arrangement application 211 of the mobile type computing device 200 and/or a product arrangement application of the desktop type computing device 300.

In the following description, a process of performing the method for providing the search result for similar products based on the image deep-learning will be described in detail with reference to the product arrangement application 211 of the mobile type computing device 200, but the present disclosure is not limited to the description. Depending on the embodiments, a product arrangement application of the desktop type computing device 300 may perform the method for providing the search result for similar products based on the image deep-learning.

FIG. 4 is a flow diagram illustrating a method for providing a similar product search result based on deep learning according to an embodiment of the present disclosure, and FIG. 5 illustrates a method for providing a similar product search result based on deep learning according to an embodiment of the present disclosure.

Referring to FIGS. 4 and 5, the product arrangement application 211 according to the embodiment of the present disclosure may acquire a search image (S101).

According to the embodiment, the search image may be an image capturing a product to be searched.

Specifically, the product arrangement application 211 according to the embodiment may provide a search interface through which a search image may be received.

Also, the product arrangement application 211 may obtain or receive a search image based on which to search for similar products according to a user input to the provided search interface.

Also, the product arrangement application 211 according to the embodiment may detect a similar product image by performing deep learning based on the obtained search image (S103).

Specifically, the product arrangement application 211 according to the embodiment may detect at least one or more similar product images based on an input search image in conjunction with an image deep-learning neural network.

At this time, the image deep-learning neural network may detect at least one or more similar product images corresponding to the input search image from a plurality of product images of the shopping mall server 500 and provide the detected similar product images as output data.

More specifically, based on the image deep-learning neural network, the product arrangement application 211 according to the embodiment may perform image deep-learning that employs a search image and a plurality of product images in the shopping mall server 500 as input data.

Here, the product arrangement application 211 may calculate a target similarity based on the image deep-learning, which is the similarity between a search image and each product image.

Specifically, the product arrangement application 211 may derive feature vector values for a search image and each product image based on the image deep-learning neural network.

Also, based on the derived feature vector values, the product arrangement application 211 may derive a distance (or difference) value between the corresponding feature vectors.

And, based on the distance value between the calculated feature vector values, the product arrangement application 211 may calculate a target similarity between the search image and the product image.

According to the embodiment, the product arrangement application 211 may calculate a distance value between each value of a plurality of feature vectors for a search image and each value of a plurality of feature vectors for the corresponding product image within the shopping mall 500.

Also, the product arrangement application 211 may derive a sum of the calculated distance values.

At this time, according to the embodiment, the product arrangement application 211 may determine that the similarity becomes higher as the derived sum becomes smaller (namely, as the distance value between feature vector values of the respective images becomes smaller).

For the convenience of description, the embodiment of the present disclosure assumes that the similarity becomes higher as the sum becomes smaller. However, the assumption is only an example and is provided for illustration purposes only, and various other embodiments are also possible.

Therefore, the product arrangement application 211 may calculate a target similarity to be inversely proportional to a derived sum value.

Also, according to the embodiment, the product arrangement application 211 may determine at least part of a plurality of products in the shopping mall server 500 as similar products based on the calculated target similarity and obtain similar product images for the determined similar products.

For example, the product arrangement application 211 may select, from among a plurality of product images in the shopping mall server 500, at least one or more product images having a target similarity within a predetermined percentage (%) as similar product images.

FIG. 6 is one example illustrating a plurality of similar product images arranged by first arrangement according to an embodiment of the present disclosure.

Also, referring to FIG. 6, the product arrangement application 211 according to the embodiment may perform first arrangement on the detected similar product images S105.

Specifically, when a plurality of similar product images are obtained or searched through deep learning based on a search image, the product arrangement application 211 according to the embodiment may arrange and provide the plurality of similar product images according to the similarity (e.g. a target similarity) between each of the similar product images and the search image.

At this time, the product arrangement application 211 according to the embodiment may determine that a similarity becomes higher as a calculated similarity value (for example, a distance value between feature vectors of the respective images) becomes lower.

In the embodiment of the present disclosure, for the convenience of description, it is assumed that the similarity becomes higher as a similarity value becomes lower. However, the assumption above is only an example, and various other embodiments may also be possible.

Also, to preferentially display a similar product image of which the calculated similarity is high, the product arrangement application 211 may arrange a plurality of similar product images so that the similarity value calculated for each of the plurality of similar product images is listed in ascending order.

For example, the product arrangement application 211 may arrange a plurality of similar product images in order of a first similar product image showing the highest similarity, a second similar product image showing a one-step or one-level lower similarity than the first similar product image, a third similar product image showing a one-step or one-level lower similarity than the second similar product image, and so on.

However, a similar product search result is provided by considering only the one-to-one target similarity between a search image and a product image provided by the shopping mall server 500. When a plurality of similar products are detected, it is usually difficult to arrange and provide the plurality of similar products consistently.

For example, ordinary users may be susceptible to the color factor in determining similarity between images.

However, when a similar product search result is provided by considering only the one-to-one target similarity between a search image and a product image, the corresponding similar products are detected based on the color of a product to be searched in the search image as well as various feature vector parameters. And images of the plurality of similar products are provided by being arranged according to the similarity measure based on the various feature vector parameters. Therefore, the image-based search may exhibit a limit that images of a plurality of similar products may not be arranged and provided after a decent visualization according to the factor (for example, color) to which the user reacts sensitively.

Therefore, the product arrangement application 211 according to the embodiment of the present disclosure may perform a second arrangement by using deep learning based on the similar product images arranged by the first arrangement and the search image (S107).

FIG. 7 is a flow diagram illustrating a method for performing second arrangement on a plurality of similar product images according to an embodiment of the present disclosure.

Specifically, referring to FIG. 7, when a plurality of similar product images are searched or obtained through deep learning based on a search image, the product arrangement application 211 according to the embodiment may perform rearrangement (i.e. second arrangement) on the plurality of similar product images by performing deep learning based on one or more predetermined parameters (for example, a product shape, color, texture, and/or a model pose) on the plurality of similar product images arranged by the first arrangement according to the target similarity between the search image and each similar product image.

FIG. 8 is one example illustrating a target similarity according to an embodiment of the present disclosure.

More specifically, referring to FIG. 8, the product arrangement application 211 according to the embodiment may check a target similarity based on a similarity between a search image and the n-th similar product image (S201 of FIG. 7). Here, the similarity may be obtained when a similar product image is detected using deep learning based on the search image.

In other words, the product arrangement application 211 may check the target similarity of the n-th similar product image obtained from the deep learning based on the search image and the n-th similar product image, one of a plurality of similar product images.

For example, the product arrangement application 211 may check the target similarity $a_1$ of the first similar product image obtained from deep learning based on a search image and the first similar product image, the target similarity $a_2$ of the second similar product image obtained from deep learning of the search image and the second similar product image, and the target similarity $a_3$ of the third similar product image obtained from deep learning based on the search image and the third similar product image.

FIG. 9 is one example illustrating a mutual similarity according to an embodiment of the present disclosure.

Also, referring to FIG. 9, the product arrangement application 211 according to the embodiment may obtain a mutual similarity between the (n−1)-th similar product image, which is a similar product image ranked immediately before the n-th similar product image (namely, a similar product image having a similarity to the search image one-step or one-level higher than the n-th similar product image) and the n-th similar product image (S203 of FIG. 7).

In other words, the product arrangement application 211 may obtain a mutual similarity of the n-th similar product image that may be obtained from deep learning based on the n-th similar product image and the (n−1)-th similar product image.

At this time, according to the embodiment, when the n-th similar product image is the first similar product image showing the highest similarity to a search image, the (n−1)-th similar product image may become the search image.

Specifically, the product arrangement application 211 according to the embodiment may obtain a mutual similarity between the n-th similar product image and the (n−1)-th similar product image by performing the deep learning based on one or more predetermined parameters (for example, a product shape, color, texture, and/or a model pose).

More specifically, the product arrangement application 211 may perform the deep learning on the n-th similar product image and the (n−1)-th similar product image based on one or more predetermined parameters and from the deep learning, calculate a similarity measure between the n-th similar product image and the (n−1)-th similar product image based on the predetermined parameter.

And the product arrangement application 211 may obtain a mutual similarity between the n-th similar product image and the (n−1)-th similar product image, namely, a mutual similarity of the n-th similar product image, based on the calculated similarity measure between the n-th similar product image and the (n−1)-th similar product image according to the predetermined parameter and obtain a mutual similarity of the n-th similar product image based on the obtained mutual similarity.

For example, the product arrangement application 211 may perform the deep learning for calculating a color similarity between the n-th similar product image and the (n−1)-th similar product image based on a color feature parameter (e.g. product color parameter).

And the product arrangement application 211 may obtain a mutual similarity between the n-th similar product image and the (n−1)-th similar product image, namely, a mutual similarity of the n-th similar product image based on a color feature parameter calculated through the deep learning performed as described above, namely, based on a color similarity value.

In what follows, it is assumed that the predetermined parameter is a color feature parameter. However, various other embodiments are also possible, which use a product shape, texture, and/or a model pose as the predetermined parameter.

For example, in the existence of a search image, a first similar product image, a second similar product image, and a third similar product image, the product arrangement application 211 may obtain a mutual similarity $b_1$ of the first similar product image by performing the deep learning on the search image (here, the (n−1)-th similar product image) and the first similar product image (here, the n-th similar product image) based on a color feature parameter.

Also, the product arrangement application 211 in the embodiment may obtain a mutual similarity $b_2$ of the second similar product image by performing the deep learning on the first similar product image (here, the (n−1)-th similar product image) and the second similar product image (here, the n-th similar product image) based on the color feature parameter.

Also, the product arrangement application 211 in the embodiment may obtain a mutual similarity $b_3$ of the third similar product image by performing the deep learning on the second similar product image (here, the (n−1)-th similar product image) and the third similar product image (here, the n-th similar product image) based on the color feature parameter.

In the same way as the target similarity, the product arrangement application 211 according to the embodiment may determine that a similarity between the n-th similar product image and a search image becomes higher as the corresponding mutual similarity obtained as above becomes lower.

In the embodiment of the present disclosure, for the convenience of description, it is assumed that the similarity to a search image becomes higher as a similarity value becomes lower. However, the assumption above is only an example and is provided for illustration purposes only, and various other embodiments may also be possible.

In this way, the product arrangement application 211 may rearrange and provide a plurality of similar product images searched based on a subsequent search image according to a more refined reference parameter (in the embodiment, an integrated similarity) by obtaining a mutual similarity between images based on a predetermined parameter.

FIG. 10 is one example illustrating an integrated similarity according to an embodiment of the present disclosure.

Referring to FIG. 10, the product arrangement application 211 according to the embodiment may acquire an integrated similarity based on an obtained mutual similarity and target similarity (S205 of FIG. 7).

In other words, the product arrangement application 211 according to the embodiment may obtain the integrated similarity of the n-th similar product image based on the target similarity and the mutual similarity of the n-th similar product image.

Here, the integrated similarity according to the embodiment may be obtained based on a target similarity of the n-th similar product image according to the similarity between a search image and the n-th similar product image and a mutual similarity of the n-th similar product image according to the similarity between the n-th similar product image and the (n−1)-th similar product image. The integrated similarity may be a reference parameter used for second arranging a plurality of similar product images.

In other words, the product arrangement application 211 according to the embodiment may obtain the integrated similarity of the n-th similar product image by which a plurality of similar product images may be arranged by the second arrangement by considering both the target similarity and the mutual similarity of the n-th similar product image.

For example, the product arrangement application 211 may obtain the integrated similarity of the n-th similar product image by summing the target similarity and the mutual similarity of the n-th similar product image, based on which the integrated similarity of the n-th similar product image may be obtained.

In the embodiment below, it is assumed that the product arrangement application 211 obtains the integrated similarity of the n-th similar product image by summing the target similarity and the mutual similarity of the n-th similar product image. However, depending on embodiments, any method may be used to calculate the integrated similarity as long as the method effectively arranges a plurality of similar product images based on the target similarity and the mutual similarity of the n-th similar product image (for example, a predetermined arithmetic operation and/or algorithm). Also, in the embodiment of the present disclosure, no particular limit or constraint is imposed on a method for obtaining the integrated similarity of the n-th similar product image.

Specifically, the product arrangement application 211 according to the embodiment may obtain the integrated similarity of the n-th similar product image by performing the sum operation based on the target similarity and the mutual similarity of the n-th similar product image.

For example, the product arrangement application 211 may obtain an integrated similarity $c_1$ of the first similar product image by summing the target similarity $a_1$ and the mutual similarity $b_1$ of the first similar product image in the existence of a search image, the first similar product image, the second similar product image, and the third similar product image.

Also, the product arrangement application 211 according to the embodiment may obtain an integrated similarity $c_2$ of the second similar product image by summing the target similarity $a_2$ and the mutual similarity $b_2$ of the second similar product image.

Also, for example, the product arrangement application 211 may obtain an integrated similarity $c_3$ of the third similar product image by summing the target similarity $a_3$ and the mutual similarity $b_3$ of the third similar product image.

At this time, the product arrangement application 211 according to the embodiment may sequentially obtain the integrated similarity of each of a plurality of similar product images arranged in order of the first arrangement starting from a search image.

For example, the product arrangement application 211 may obtain an integrated similarity of the first similar product image by performing the deep learning based on a search image and the first similar product image. Then the product arrangement application 211 may obtain an integrated similarity of the second similar product image by performing the deep learning based on the first similar product image and the second similar product image. In the same way, the product arrangement application 211 may obtain an integrated similarity of the n-th similar product image by performing the deep learning based on the n-th similar product image and the (n−1)-th similar product image.

As described above, by obtaining an integrated similarity of each similar product image, the product arrangement application 211 may consider not only the similarity between a search image and a similar product image based on feature vectors but also the similarity between a plurality of images based on a predetermined criterion (parameter). From the operation above, the product arrangement application 211 may detect and provide a plurality of similar product images provided with respect to the search image based on a more detailed and accurate similarity.

FIG. 11 is one example illustrating a plurality of similar product images arranged by second arrangement according to an embodiment of the present disclosure.

Also, referring to FIG. 11, the product arrangement application 211 according to the embodiment may perform a second arrangement on a plurality of first arranged similar product images based on the integrated similarity obtained as described above (S207 of FIG. 7).

Specifically, the product arrangement application 211 according to the embodiment may determine that the similarity between the n-th similar product image and a search image becomes higher as an integrated similarity of the corresponding n-th similar product image becomes lower.

In the embodiment of the present disclosure, for the convenience of description, it is assumed that the similarity to a search image becomes higher as a similarity value becomes lower. However, the assumption is only an example and is provided for illustration purposes only, and various other embodiments may also be possible.

Also, based on the integrated similarity calculated sequentially for each of a plurality of similar product images arranged by the first arrangement in ascending order according to their target similarity, the product arrangement application 211 according to the embodiment may perform a second arrangement that rearranges the plurality of similar product images in ascending order.

Specifically, the product arrangement application 211 may obtain an integrated similarity of the n-th similar product image and then sequentially obtain an integrated similarity of the (n+1)-th similar product image (namely, in the embodiment, a similar product image of which the similarity to a search image is one-step lower than the n-th similar product image).

At this time, the product arrangement application 211 may compare the obtained integrated similarity of the n-th similar product image with that of the (n+1)-th similar product image.

Also, through the comparison, the product arrangement application 211 may determine a similar product image having a lower similarity between the n-th similar product image and the (n+1)-th similar product image.

And the product arrangement application 211 may determine that the integrated similarity of a similar product image determined to have a lower integrated similarity (for example, the n-th similar product image) is higher than that of the other similar product image (for example, the (n+1)-th similar product image).

Also, the product arrangement application 211 may arrange so that a similar product image determined to have a higher integrated similarity (for example, the n-th similar product image) is disposed or arranged before the other similar product image (for example, the (n+1)-th similar product image).

Afterward, the product arrangement application 211 according to the embodiment may calculate integrated similarities of the (n+2)-th similar product image, the (n+3)-th similar product image, . . . , and the (n+n)-th similar product image (where n=1, 2, 3, . . . ) sequentially. Each time an integrated similarity is calculated sequentially, the product arrangement application 211 may perform a priority arrangement based on the corresponding integrated similarity.

Accordingly, the product arrangement application 211 may perform a stepwise arrangement from the n-th similar product image to the (n+n)-th similar product image based on integrated similarities calculated sequentially.

In other words, the product arrangement application 211 may perform the second arrangement that rearranges a plurality of similar product images in descending order of integrated similarities by performing an arrangement on the plurality of similar product images.

For example, the product arrangement application 211 may obtain 4.394 as an integrated similarity of the first similar product image and then obtain 4.733 as an integrated similarity of the second similar product image.

And the product arrangement application 211 may compare obtained integrated similarities of the first and second similar product images and preferentially list the first similar product image having a lower integrated similarity value.

Next, the product arrangement application 211 may obtain 4.503 as an integrated similarity value of the third similar product image.

Also, the product arrangement application 211 may compare the integrated similarities of the second and third similar product images.

And the product arrangement application 211 may perform an arrangement that preferentially lists the third similar product image determined to have a lower integrated similarity value from the comparison.

In other words, based on the integrated similarities of the first to third similar product images, the second arrangement may be performed on a plurality of similar products arranged in order of the first similar product image, the second similar product image, and the third similar product image at the time of the first arrangement. Through the second arrangement, the plurality of similar product images is rearranged in order of the first similar product image, the third similar product image, and the second similar product image.

As described above, the product arrangement application 211 sequentially calculates an integrated similarity for each of a plurality of similar product images arranged by the first arrangement and performs rearrangement (e.g. the second arrangement) through comparison among integrated similarities each time an integrated similarity is calculated sequentially. Accordingly, a plurality of similar product images may be arranged and provided based on similarities calculated by a more precise criterion. Through the operation, a plurality of similar product images provided with respect to a search image may be recognized more conveniently and intuitively according to a predetermined criterion (for example, color), and the quality of a similar product providing service through image-based deep learning may be improved.

Also, the product arrangement application 211 according to the embodiment may output the second arranged similar product images to the user (S109 of FIG. 4).

In other words, the product arrangement application 211 according to the embodiment may provide similar product images detected through the deep learning based on a search image to the user by arranging the similar product images according to integrated similarities obtained for the respective similar product images and outputting the arranged similar product images to the display 271.

As described above, a method and a system for providing a search result for similar product images based on deep learning according to an embodiment of the present disclosure may provide a similar product search result based on deep learning of an image including a product to be searched by arranging the corresponding search result based on the similarity according to a specific parameter. Therefore, the method and the system may provide an effect of enabling a user to more conveniently and intuitively recognize a plurality of similar product images according to a predetermined criterion (for example, color), through which the quality of a similar product search result based on deep learning is improved.

Also, a method and a system for providing a search result for similar product images based on deep learning according to an embodiment of the present disclosure may provide a similar product search result by measuring not only the similarity between an image including a product to be searched (e.g. a target object) and images including similar products (e.g. a search result) but also the similarity based on a specific parameter among similar product images derived from the search result and arranging a plurality of similar product images based on the measured similarities. Therefore, the method and the system may have the effect of providing a search result by detecting similar product images for a search image based on a precise and accurate similarity, further considering the similarity among a plurality of images based on a predetermined criterion (or parameter) in addition to the similarity to the search image based on a feature vector.

Also, a method and a system for providing a search result for similar product images based on deep learning according to an embodiment of the present disclosure may provide a similar product search result based on image deep-learning by arranging the similar product search result based on the similarity according to a predetermined parameter. Therefore, the method and the system may maximize the reflection of the user's needs to check products similar to a search image easily and quickly and increase the competitiveness of an online shopping mall.

Also, the embodiments of the present disclosure described above may be implemented in the form of program commands which may be executed through various types of computer means and recorded in a computer-readable recording medium. The computer-readable recording medium may include program commands, data files, and data structures separately or in combination thereof. The program commands recorded in the computer-readable recording medium may be those designed and configured specifically for the present disclosure or may be those commonly available for those skilled in the field of computer software. Examples of a computer-readable recoding medium may include a magnetic medium such as a hard-disk, a floppy disk, and a magnetic tape; an optical medium such as a CD-ROM and a DVD; a magneto-optical medium such as a floptical disk; and a hardware device specially designed to store and execute program commands such as a ROM, a RAM, and a flash memory. Examples of program commands include not only machine code such as one created by a compiler but also high-level language code which may be executed by a computer through an interpreter and the like. The hardware device may be configured to be operated by one or more software modules to perform the operations of the present disclosure, and vice versa.

What is claimed is:

1. A method for providing a search result for similar products based on image deep-learning by a product search result arrangement application executed by a computing device, the method comprising:
   receiving a search image including a product to be searched;
   searching one or more similar product images similar to the search image by performing deep learning based on the search image;
   when a plurality of the similar product images are searched, performing a first arrangement by arranging the plurality of the similar product images based on a target similarity for each of the plurality of the similar product images, wherein the target similarity represents a similarity between the search image and one of the plurality of the similar product images;
   performing deep learning on the plurality of the similar product images, arranged based on the target similarity, based on one or more predetermined parameters;
   obtaining a mutual similarity representing a similarity between at least two of the plurality of the similar product images by performing the deep learning on at least two of the plurality of the similar product images based on the one or more predetermined parameters;
   obtaining an integrated similarity for each of the plurality of the similar product images based on the mutual similarity and the target similarity;
   performing a second arrangement by arranging the plurality of the similar product images based on the integrated similarity; and
   outputting the plurality of the similar product images arranged based on the integrated similarity calculated based on the mutual similarity and the target similarity,
   wherein the obtaining of the mutual similarity includes obtaining the mutual similarity of an n-th similar product image by performing the deep learning on the n-th similar product image and an (n−1)-th similar product image based on the one or more predetermined parameters, wherein n is a positive integer more than 1, and
   wherein the integrated similarity is obtained based on a target similarity value of the n-th similar product image, obtained according to a similarity between the search image and the n-th similar product image, and a mutual similarity value of the n-th similar product image, obtained according to a similarity between the n-th similar product image and the (n−1)-th similar product image.

2. The method of claim 1, wherein the target similarity represents a similarity between the search image and the one of the plurality of the similar product images based on feature vectors of the search image and the one of the plurality of the similar product images.

3. The method of claim 1, wherein the one or more predetermined parameters include at least one of a product color parameter, a product shape parameter, a product texture parameter, or a product model pose parameter.

4. The method of claim 1, wherein the obtaining of the mutual similarity includes obtaining the mutual similarity for each of the plurality of similar product images.

5. The method of claim 1, wherein the obtaining of the integrated similarity includes obtaining an integrated similarity value sequentially for each of the plurality of the similar product images arranged based the target similarity by performing the first arrangement.

6. The method of claim 5, wherein the obtaining of the integrated similarity includes obtaining the integrated similarity value of the n-th similar product image and then obtaining the integrated similarity value of the (n+1)-th similar product image.

7. The method of claim 6, wherein the performing of the second arrangement includes comparing integrated similarity values with each other each time the integrated similarity values of the n-th similar product image and the (n+1)-th similar product image are obtained sequentially.

8. The method of claim 7, wherein the performing of the second arrangement includes arranging the similar product images in descending order of the integrated similarity by comparing the integrated similarity values with each other.

9. A system for providing a search result for similar products based on deep learning, the system comprising:
 a computing device executing a product search result arrangement application providing a search result for similar products based on image deep-learning;
 a product search server providing an environment in which the product search result arrangement application operates; and
 a shopping mall server providing data required for the similar product search for an online shopping mall service,
 wherein the computing device is configured to:
 receive a search image including a product to be searched by controlling the product search result arrangement application and search one or more similar product images similar to the search image by performing deep learning based on the search image;
 when a plurality of the similar product images are searched, perform a first arrangement by arranging the plurality of the similar product images based on a target similarity for each of the plurality of the similar product images, wherein the target similarity represents a similarity between the search image and one of the plurality of the similar product images;
 perform deep learning on the plurality of the similar product images, arranged based on the target similarity, based on one or more predetermined parameters, and obtain a mutual similarity representing a similarity between at least two of the plurality of the similar product images by performing the deep learning on at least two of the plurality of the similar product images based on the one or more predetermined parameters; and
 obtain an integrated similarity for each of the plurality of the similar product images based on the mutual similarity and the target similarity, perform a second arrangement by arranging the plurality of the similar product images based on the integrated similarity, and output the plurality of the similar product images arranged based on the integrated similarity calculated based on the mutual similarity and the target similarity,
 wherein the computing device obtains the mutual similarity of an n-th similar product image by performing the deep learning on the n-th similar product image and an (n−1)-th similar product image based on the one or more predetermined parameters, wherein n is a positive integer more than 1, and
 wherein the integrated similarity is obtained based on a target similarity value of the n-th similar product image, obtained according to a similarity between the search image and the n-th similar product image, and a mutual similarity value of the n-th similar product image, obtained according to a similarity between the n-th similar product image and the (n−1)-th similar product image.

10. The system of claim 9, wherein the target similarity represents a similarity between the search image and the one of the plurality of the similar product images based on feature vectors of the search image and the one of the plurality of the similar product images.

11. The system of claim 9, wherein the one or more predetermined parameters include at least one of a product color parameter, a product shape parameter, a product texture parameter, or a product model pose parameter.

12. The system of claim 9, wherein the computing device obtains the mutual similarity for each of the plurality of similar product images.

13. The system of claim 9, wherein the computing device obtains an integrated similarity value sequentially for each of the plurality of the similar product images arranged based the target similarity by performing the first arrangement.

14. The system of claim 13, wherein the computing device obtains the integrated similarity value of the n-th similar product image and then obtains the integrated similarity value of the (n+1)-th similar product image.

15. The system of claim 14, wherein the computing device compares integrated similarity values with each other each time the integrated similarity values of the n-th similar product image and the (n+1)-th similar product image are obtained sequentially.

16. The system of claim 15, wherein the computing device performs the second arrangement by arranging the similar product images in descending order of the integrated similarity by comparing the integrated similarity values with each other.

* * * * *